L. BELLINGRATH.
GAS AND AIR MIXING APPARATUS.

No. 180,527. Patented Aug. 1, 1876.

3 Sheets—Sheet 1.

WITNESSES
Henry N. Miller
F. L. Durand

INVENTOR
Leonard Bellingrath
By Alexander Macon
Attorneys

3 Sheets—Sheet 2.

L. BELLINGRATH.
GAS AND AIR MIXING APPARATUS.

No. 180,527. Patented Aug. 1, 1876.

WITNESSES
Henry N. Miller
F. L. Durand

INVENTOR
Leonard Bellingrath
By Hunder & Mason
Attorneys

3 Sheets—Sheet 3.

L. BELLINGRATH.
GAS AND AIR MIXING APPARATUS.

No. 180,527. Patented Aug. 1, 1876.

WITNESSES
Henry N. Miller
P. L. Durand

INVENTOR
Leonard Bellingrath
By Alexander Mason
Attorneys

UNITED STATES PATENT OFFICE.

LEONARD BELLINGRATH, OF ATLANTA, GEORGIA.

IMPROVEMENT IN GAS AND AIR MIXING APPARATUS.

Specification forming part of Letters Patent No. 180,527, dated August 1, 1876; application filed June 13, 1876.

*To all whom it may concern:*

Be it known that I, LEONARD BELLINGRATH, of Atlanta, in the county of Fulton, and in the State of Georgia, have invented certain new and useful Improvements in a Gas and Air Mixing Apparatus; and do hereby declare that the following is a full, clear, and exact description thereof, reference being had to the accompanying drawings, and to the letters of reference marked thereon, making a part of this specification.

The nature of my invention consists in the construction and arrangement of a gas and air mixing apparatus, as will be hereinafter more fully set forth.

In order to enable others skilled in the art to which my invention appertains to make and use the same, I will now proceed to describe its construction and operation, referring to the annexed drawings, in which—

Figure 1:
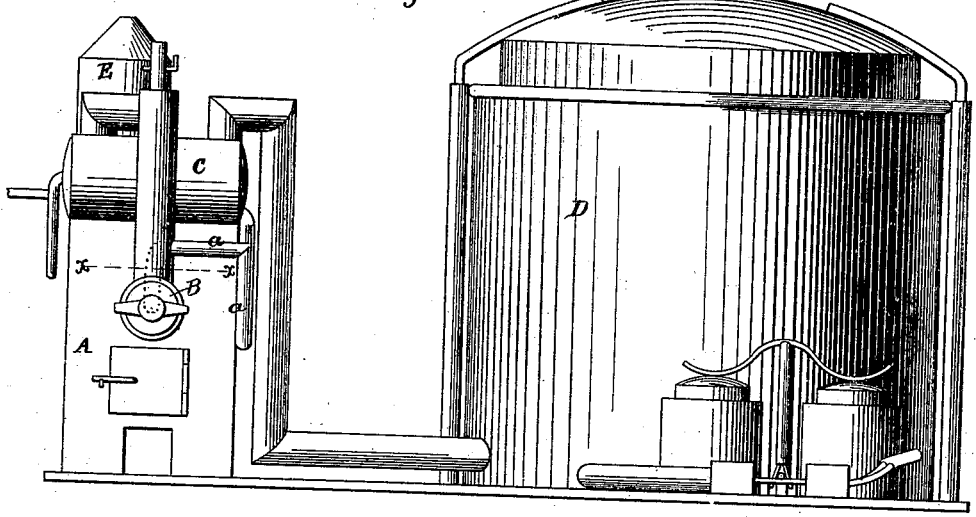
Figure 2:
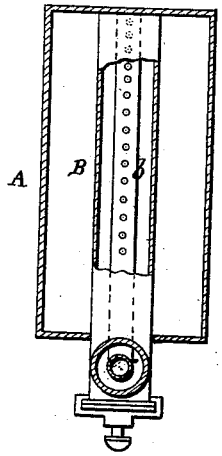
Figure 3:
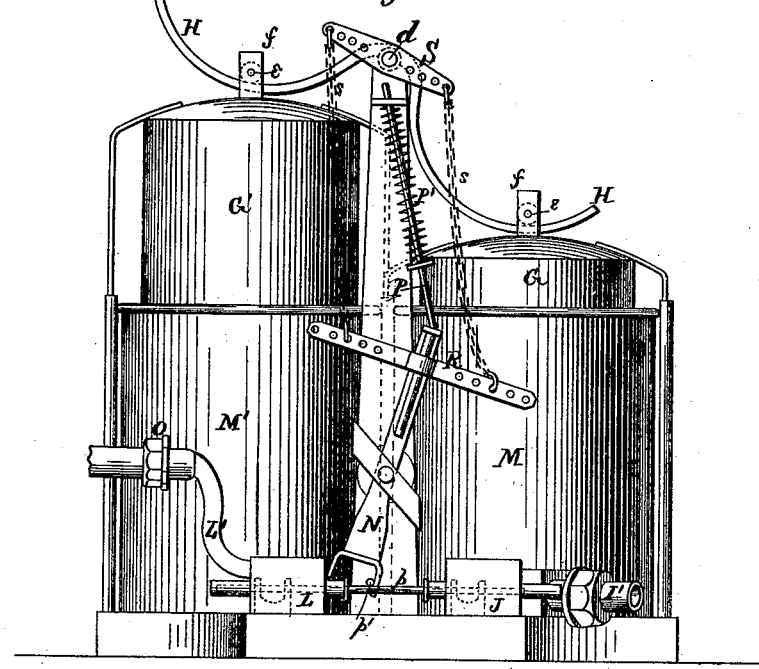
Figure 4:
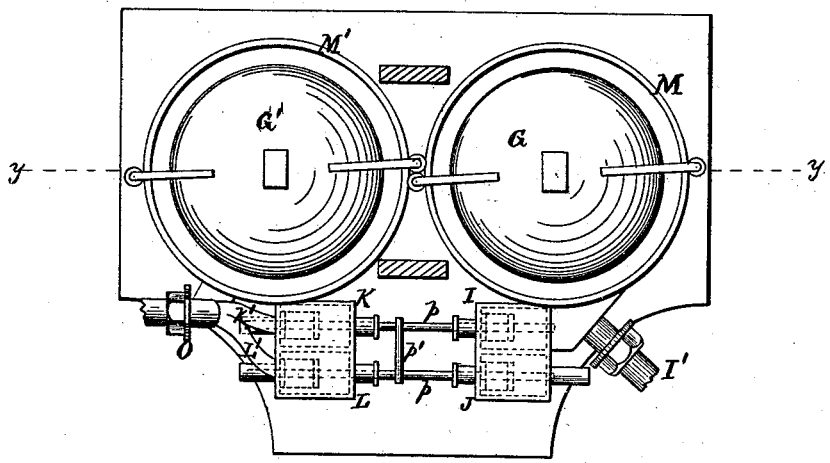

Figure 1 is a side elevation of my entire gas-machine. Fig. 2 is an enlarged section of the retort. Fig. 3 is an enlarged side elevation of the manipulator. Fig. 4 is a plan view, Fig. 5 a vertical section, and Fig. 6 a horizontal section, of the same.

A represents the furnace with retort B therein. C is the washer, and D the gas-holder. E is the oil-tank, with pipe $a$ leading from the same to the retort B. The end of the pipe $a$ connects with a perforated pipe, $b$, which runs longitudinally through the center of the retort, and is closed at the end. This pipe is only perforated on its top, and closed at its bottom. The oil passes from the tank, through the pipe $a$, into the perforated pipe $b$, and is supplied to the retort through the perforations in the same, for the more perfect decomposition of the oil. The perforated pipe running through the retort becomes hot enough to drive the oil into gas as soon as it enters the pipe, the gas discharging itself through the perforations into the red-hot retort, making the decomposition complete. The gas passes from the retort to the washer, and from the washer into the holder.

Figure 5:
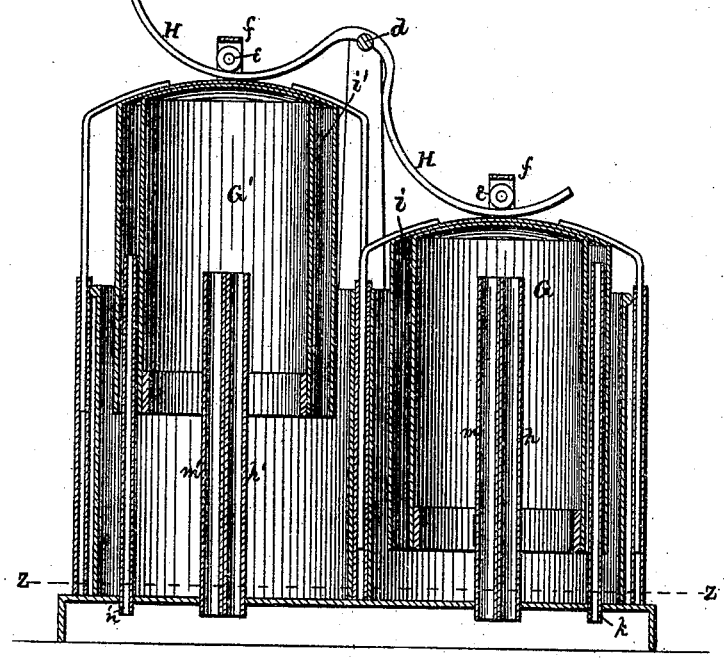
Figure 6:
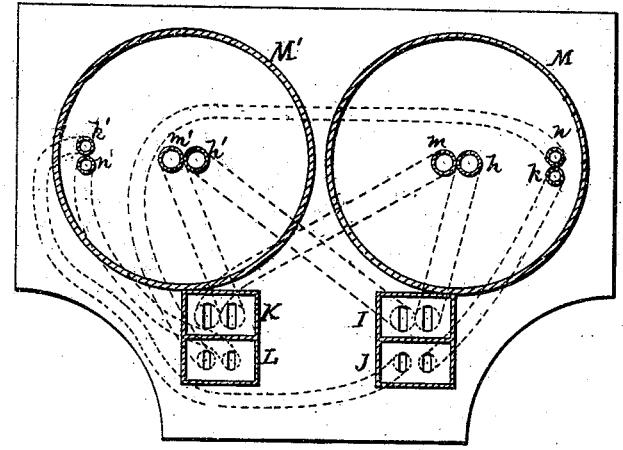

Connected with the machine is a gas and air mixer, worked by the pressure of the gas, for the purpose of charging the same with any desired quantity of atmospheric air, thereby increasing the luminosity of the gas, and at the same time reducing the cost. This device also registers the cubic feet of gas passing through it. It is constructed as follows: G G' are two holders, working on a balance from a rock-shaft, $d$. From this shaft extend two curved arms, H H, which pass under rollers $e\ e$, mounted in frames $f$ on top of the holders. The holders G G' are formed with divisions for air and gas, as shown in Fig. 5—that is, each holder is formed of two concentric cylinders attached together, and rising and falling simultaneously, one holder discharging while the other is receiving gas and air, in the following manner: I is a gas-valve, receiving gas from the holder through a pipe, I', said valve having two orifices, one connecting with the pipe $h$ in one holder, and the other connecting with the pipe $h'$ in the other holder. By the side of this valve is the receiving air-valve J, connecting, in the same manner as the receiving gas-valve, by pipes $k\ k'$, with the air-divisions $i\ i'$ in the holders. K is the discharging gas-valve, having also two orifices, and connecting with the discharging-pipes $m\ m'$ in the holders. L is the discharging air-valve, connecting with the discharging-pipes $n\ n'$ in the air-divisions of the holders. K' and L' are the pipes, respectively, from the discharging gas and air valves, which pipes connect at O, and from there the mixture of air and gas flows to the burners. M M' are the water-tanks for the holders G G' to move in.

The receiving and discharging gas-valves are connected to a common valve-rod, $p$, and the receiving and discharging air-valves are connected in the same manner by a rod, $p$, and the two rods are connected by a bar, $p'$, as shown, so as to make the whole valve system move together, and in such a manner as to have the discharging-ports of one holder and the receiving-ports of the other open at the same time.

The valves are worked by a fork, N, pivoted to one of the standards that support the rocking shaft $d$, and its lower end working upon the connecting-bar $p'$ of the valve system. The upper end of the fork N is connected to a spring-rod, P', which is actuated by two chains, $s\ s$, connecting two cross-bars, R and S, the former fastened to the upper end of the fork-bar, and the latter to the shaft $d$. The motion to this mechanism is given by the rise and fall of the holders, by which the spring P' is compressed by the action of the chains, so as to carry the spring-rod past the center, and when there the spring acts by expanding and moves the valves.

The gas and air mixer may be placed between the retort and the holder, so as to mix in the holder at pleasure. A registering apparatus may also be connected with and operated from the rocking shaft $d$, so as to measure and indicate the quantity of gas consumed.

Having thus fully described my invention, what I claim as new, and desire to secure by Letters Patent, is—

1. The combination of the holders G G', with frames $f f$, rollers $e e$, and rocking shaft $d$, with curved arms H H, substantially as and for the purposes herein set forth.

2. The combination of the double holders G G', pipes $m h k n$ and $m' h' k' n'$, and the valves I J K L, all constructed and arranged substantially as and for the purposes herein set forth.

3. The combination, with the system of valves, as herein described, of the fork N, spring-rod P, arm R, chains $s s$, and arm S on the shaft $d$, from which the holders are balanced, substantially as and for the purposes herein set forth.

In testimony that I claim the foregoing I have hereunto set my hand this 7th day of June, 1876.

LEONARD BELLINGRATH.

Witnesses:
  C. W. HUNNICUTT,
  W. F. PARKHURST.